US011816913B2

(12) United States Patent
Rastogi et al.

(10) Patent No.: US 11,816,913 B2
(45) Date of Patent: Nov. 14, 2023

(54) METHODS AND SYSTEMS FOR EXTRACTING INFORMATION FROM DOCUMENT IMAGES (71) Applicant: Tata Consultancy Services Limited, Mumbai (IN)

(72) Inventors: Mouli Rastogi, Gurgaon (IN); Syed Afshan Ali, Gurgaon (IN); Mrinal Rawat, Gurgaon (IN); Lovekesh Vig, Gurgaon (IN); Puneet Agarwal, Noida (IN); Gautam Shroff, Gurgaon (IN); Ashwin Srinivasan, Goa (IN)

(73) Assignee: Tata Consultancy Services Limited, Mumbai (IN)

( * ) Notice: Subject to any disclaimer, the term of this patent is extended or adjusted under 35 U.S.C. 154(b) by 322 days.

(21) Appl. No.: 17/332,021

(22) Filed: May 27, 2021

(65) Prior Publication Data

US 2022/0284215 A1    Sep. 8, 2022

(30) Foreign Application Priority Data

Mar. 2, 2021   (IN) .............................. 202121008796

(51) Int. Cl.
*G06K 9/00* (2022.01)
*G06F 16/93* (2019.01)
(Continued)

(52) U.S. Cl.
CPC ........ *G06V 30/418* (2022.01); *G06F 16/9024* (2019.01); *G06F 16/93* (2019.01);
(Continued)

(58) Field of Classification Search
CPC .......... G06V 30/418; G06V 30/18057; G06V 10/454; G06V 30/10; G06V 30/413;
(Continued)

(56) References Cited

U.S. PATENT DOCUMENTS 6,687,404 B1 *  2/2004  Hull .................... G06V 30/40
                                                        382/226
9,047,529 B2    6/2015  Xue
(Continued)

FOREIGN PATENT DOCUMENTS

JP          6487100 B1       3/2019

OTHER PUBLICATIONS

Liu et al., "Graph Convolution for Multimodal Information Extraction from Visually Rich Documents," Information Retrieval (2019).
(Continued)

*Primary Examiner* — Edward F Urban
*Assistant Examiner* — Duy Tran
(74) *Attorney, Agent, or Firm* — Finnegan, Henderson, Farabow, Garrett & Dunner, LLP (57) ABSTRACT

This disclosure relates to a method and system for extracting information from images of one or more templatized documents. A knowledge graph with a fixed schema based on background knowledge is used to capture spatial and semantic relationships of entities present in scanned document and an adaptive lattice-based approach based on formal concepts analysis (FCA) is used to determine a similarity metric that utilizes both spatial and semantic information to determine if the structure of the scanned document image adheres to any of the known document templates. If a known document template whose structure is closely matching the structure of the scanned document is detected, then an inductive rule learning based approach is used to learn symbolic rules to extract information present in scanned document image and if a new document template is detected, then future scanned document images belonging to new document template are automatically processed using the learnt rules.

10 Claims, 3 Drawing Sheets

(51) Int. Cl.
*G06F 16/901* (2019.01)
*G06K 9/62* (2022.01)
*G06K 9/40* (2006.01)
*G06K 9/46* (2006.01)
*G06V 30/418* (2022.01)
*G06V 10/30* (2022.01)
*G06V 10/426* (2022.01)
*G06V 10/75* (2022.01)
*G06V 30/413* (2022.01)
*G06V 30/414* (2022.01)
*G06F 18/21* (2023.01)
*G06F 18/22* (2023.01)
*G06V 30/18* (2022.01)

(52) U.S. Cl.
CPC .............. *G06F 18/21* (2023.01); *G06F 18/22* (2023.01); *G06V 10/30* (2022.01); *G06V 10/426* (2022.01); *G06V 10/751* (2022.01); *G06V 30/18057* (2022.01); *G06V 30/413* (2022.01); *G06V 30/414* (2022.01)

(58) Field of Classification Search
CPC .... G06V 10/751; G06V 10/30; G06V 10/426; G06V 30/414; G06V 30/333; G06V 30/40; G06V 30/18; G06V 30/1801; G06V 30/18019; G06V 30/18152; G06V 30/18181; G06V 30/186; G06V 10/10; G06V 10/20; G06V 30/19013; G06F 16/93; G06F 16/9024; G06F 16/9027; G06F 18/00; G06F 18/22; G06F 18/21; G06F 18/2323; G06F 18/211

See application file for complete search history.

(56) References Cited

U.S. PATENT DOCUMENTS

| | | | |
|---|---|---|---|
| 2005/0185841 A1* | 8/2005 | Tyan | G06F 16/5846 |
| | | | 707/E17.022 |
| 2015/0281739 A1* | 10/2015 | Russell | G06V 30/133 |
| | | | 382/182 |
| 2016/0148074 A1* | 5/2016 | Jean | G06V 10/462 |
| | | | 382/190 |
| 2020/0175304 A1* | 6/2020 | Vig | G06F 16/2455 |
| 2021/0019360 A1* | 1/2021 | Li | G06F 40/169 |

OTHER PUBLICATIONS

Schulz et al., "Seizing the Treasure: Transferring Layout Knowledge in Invoice Analysis," International Conference on Document Analysis and Recognition (2009).

* cited by examiner

METHODS AND SYSTEMS FOR EXTRACTING INFORMATION FROM DOCUMENT IMAGES

CROSS-REFERENCE TO RELATED APPLICATIONS AND PRIORITY

This U.S. patent application claims priority under 35 U.S.C. § 119 to India Application No. 202121008796, filed on Mar. 2, 2021. The entire content of the abovementioned application is incorporated herein by reference.

TECHNICAL FIELD

The disclosure herein generally related to the field of image processing, and, more particularly, to methods and systems for extracting textual information from document images such as scanned document images.

BACKGROUND

Processing of scanned document images such as invoice, receipts, and so on, is an important aspect in the present digital arena for organizations such as financial organizations, educational institutes, hospitals, and so on. The processing of scanned document images typically includes extracting the textual information present in the associated scanned document images and storing in a structured format. The scanned document images may be associated different kinds of templates as different organizations may use different kind of forms and templates. With the widespread usage of mobile cameras and fast scanners to capture these document images, the problem of downstream textual information extraction from such scanned document images has become more acute. Typical process in extracting the information from the scanned document image include identifying suitable matching document template and then extracting the entity values present in the scanned document image based on the entities present in the matching document template.

Conventional machine learning based techniques for information extraction from scanned document image, use a combination of (i) deep learning vision models for detection of entities and primitive relations between the entities present in the scanned document image, (ii) symbolic background knowledge that expresses prior information about spatial and semantic relationships, using the entities and the primitive relations, and (iii) learning of symbolic extraction rules using annotations of one or exemplary some scanned document images. However, several challenges may arise in ensuring that the deep learning-symbolic techniques stack works together seamlessly. Some of the challenges include (i) vision-based challenges to ensure that the scanned document images are seen at the appropriate level of detail to detect entities, (ii) symbolic representation challenges in identifying primitive relations between the detected entities, and (iii) learning-based challenges in identifying appropriate level of symbolic abstraction for the retrieval rules, the need to identify background knowledge that is relevant to the scanned document images being analyzed, and learning general symbolic rules in data-deficient domains.

Further, humans perceive the scanned document images using a combination of visual and textual cues, many of which are not captured by the conventional vision-based models. Additionally, human may also draw on significant domain specific and universal (common sense) background knowledge to relate and reason over visual and textual components of the scanned document images. The conventional techniques may not incorporate the visual and the textual components in order to match human performance on the information extraction.

SUMMARY

Embodiments of the present disclosure provides technological improvements as solutions to one or more of the above-mentioned technical problems recognized by the inventors in conventional systems. For example, in one embodiment, a method and system for extracting information from images of one or more templatized documents is discussed.

In one aspect, a system is configured for extracting information from images of one or more templatized documents. The system comprises at least one memory storing a plurality of instructions and one or more hardware processors communicatively coupled with the at least one memory, wherein the one or more hardware processors are configured to execute one or more modules.

The system herein configured to receive via an input/output interface, at least one image of each of the one or more templatized documents in a predefined sequence from which the information to be extracted and a template document dataset, wherein the template document dataset includes a predefined set of template documents, a knowledge graph for each template document and a rule set for each template document. Further, the system is configured to pre-process The pre-processed the received at least one image of each of the one or more templatized documents using a cycle generative adversarial network (GAN) to obtain a pre-processed image of each of the one or more templatized documents, identify words and sentences along with a spatial relationship for each word from each pre-processed image of the one or more templatized documents using a vision model and an optical character recognition (OCR) technique and to generate a knowledge graph for each pre-processed image of the one or more templatized documents using a schema from the identified words and sentences, and the spatial relationship for each word, wherein each word is represented by a node, and a sub-graph for each word is formed in the knowledge graph.

Further, the system is configured to determine a similarity metric by comparing the generated knowledge graph of each pre-processed image with a knowledge graph of each template document present in the template document dataset using a Formal Concept Analysis (FCA). Herein, the similarity metric provides at least one matched template document from the template document dataset for each pre-processed image of the one or more templatized documents. Further, the system extracts information of the pre-processed image by applying the rule set of the at least one matched template document from the template document dataset on the generated knowledge graph of each pre-processed image of the one or more templatized documents.

Furthermore, the system is configured to compare paths of each pair of nodes in the knowledge graph of the matched template document with corresponding nodes in the generated knowledge graph to remove at least one node from the generated knowledge graph and to obtain an updated knowledge graph corresponding to each pre-processed image of the one or more templatized documents and calculate a layout similarity metric of each pre-processed image by comparing the updated knowledge graph with the matched knowledge graph using a lattice based structural similarity technique, wherein the layout similarity metric is below a predefined confidence threshold then the pre-processed image is sent for a manual annotation.

In another aspect, a processor-implemented method for extracting information from images of one or more templatized documents is discussed. The processor-implemented method comprising one or more steps as follows. The method comprising receiving at least one image of each of the one or more templatized documents in a predefined sequence from which the information to be extracted and a template document dataset and pre-process the received at least one image of each of the one or more templatized documents using a cycle generative adversarial network (GAN) to obtain a pre-processed image of each of the one or more templatized documents. The processor-implemented method further includes identifying words and sentences along with a spatial relationship for each word from each pre-processed image of the one or more templatized documents using a vision model and an optical character recognition (OCR) technique, generating a knowledge graph for each pre-processed image of the one or more templatized documents using a schema from the identified words and sentences, and the spatial relationship for each word, determining a similarity metric by comparing the generated knowledge graph of each pre-processed image with a knowledge graph of each template document present in the template document dataset using a Formal Concept Analysis (FCA) and extracting the information of the pre-processed image by applying the rule set of the at least one matched template document from the template document dataset on the generated knowledge graph of each pre-processed image of the one or more templatized documents.

Furthermore, the processor-implemented method comprising comparing, via the one or more hardware processors, paths of each pair of nodes in the knowledge graph of the matched template document with corresponding nodes in the generated knowledge graph to remove at least one node from the generated knowledge graph and to obtain an updated knowledge graph corresponding to each pre-processed image of the one or more templatized documents and calculating, via the one or more hardware processors, a layout similarity metric of each pre-processed image by comparing the updated knowledge graph with the matched knowledge graph using a lattice based structural similarity technique, wherein the layout similarity metric is below a predefined confidence threshold then the pre-processed image is sent for a manual annotation.

In yet another aspect, a non-transitory computer readable medium storing one or more instructions which when executed by one or more processors on a system cause the one or more processors to perform the method is provided. The non-transitory computer readable medium for extracting information from images of one or more templatized documents is provided. The method comprising receiving at least one image of each of the one or more templatized documents in a predefined sequence from which the information to be extracted and a ten plate document dataset and pre-process the received at least one image of each of the one or more templatized documents using a cycle generative adversarial network (GAN) to obtain a pre-processed image of each of the one or more templatized documents.

The processor-implemented method further includes identifying words and sentences along with a spatial relationship for each word from each pre-processed image of the one or more templatized documents using a vision model and an optical character recognition (OCR) technique, generating a knowledge graph for each pre-processed image of the one or more templatized documents using a schema from the identified words and sentences, and the spatial relationship for each word, determining a similarity metric by comparing the generated knowledge graph of each pre-processed image with a knowledge graph of each template document present in the template document dataset using a Formal Concept Analysis (FCA) and extracting the information of the pre-processed image by applying the rule set of the at least one matched template document from the template document dataset on the generated knowledge graph of each pre-processed image of the one or more templatized documents.

Furthermore, the processor-implemented method comprising comparing, via the one or more hardware processors, paths of each pair of nodes in the knowledge graph of the matched template document with corresponding nodes in the generated knowledge graph to remove at least one node from the generated knowledge graph and to obtain an updated knowledge graph corresponding to each pre-processed image of the one or more templatized documents and calculating, via the one or more hardware processors, a layout similarity metric of each pre-processed image by comparing the updated knowledge graph with the matched knowledge graph using a lattice based structural similarity technique, wherein the layout similarity metric is below a predefined confidence threshold then the pre-processed image is sent for a manual annotation.

It is to be understood that both the foregoing general description and the following detailed description are exemplary and explanatory only and are not restrictive of the invention, as claimed.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The present disclosure herein provides methods and systems for extracting information from document images such as scanned document images, solves the technical problems present in the art. A knowledge graph with a fixed schema based on background knowledge is used to capture spatial and semantic relationships of the entities present in the scanned document image. An adaptive lattice based approach based on formal concepts analysis (FCA) is used to determine a similarity metric that utilizes both the spatial and semantic information in the scanned document image to determine if the structure of the scanned document image adheres to any of the known document templates. If the known document template whose structure is closely matching the structure of the scanned document image is detected, then an inductive rule learning based approach is used to learn the symbolic rules to extract the information present in the scanned document image. If a new document template is detected, then any future scanned document images belonging to the new document template are automatically processed using the learnt rules.

Figure 1:
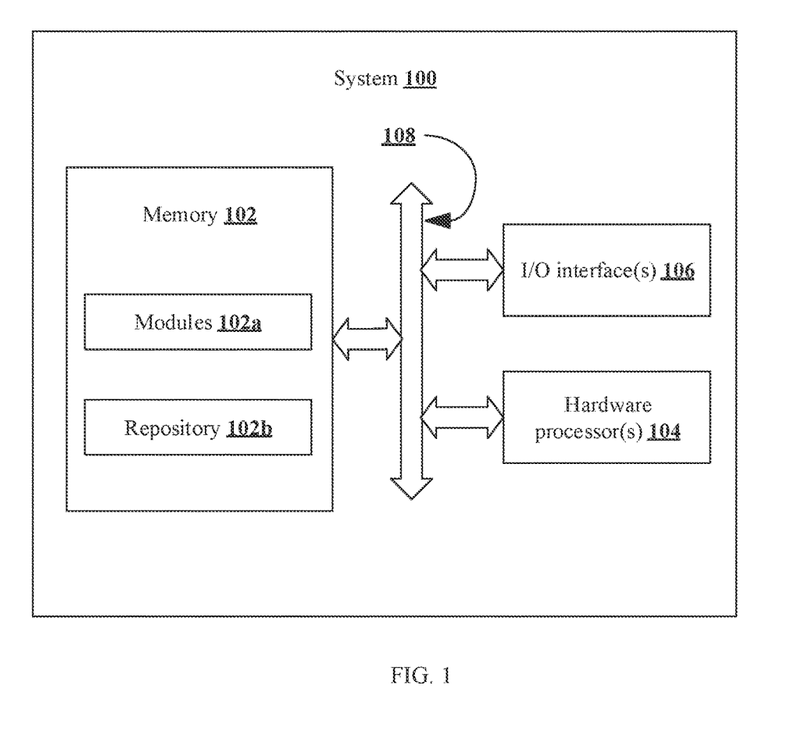
FIG. 1 is an exemplary block diagram of a system for extracting information from document images, in accordance with some embodiments of the present disclosure.
Figure 2:
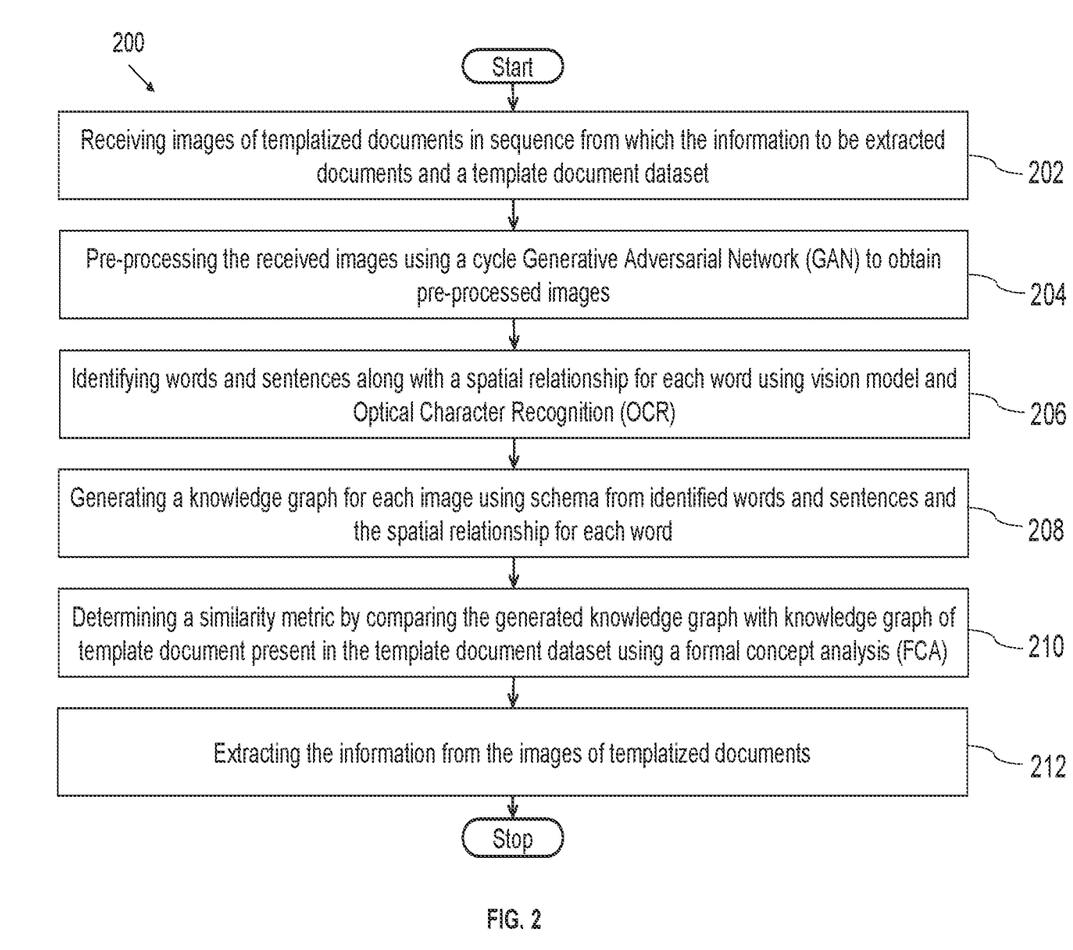
FIG. 2 illustrates an exemplary flow diagram of a processor-implemented method for extracting information from document images, in accordance with some embodiments of the present disclosure.
Figure 3:
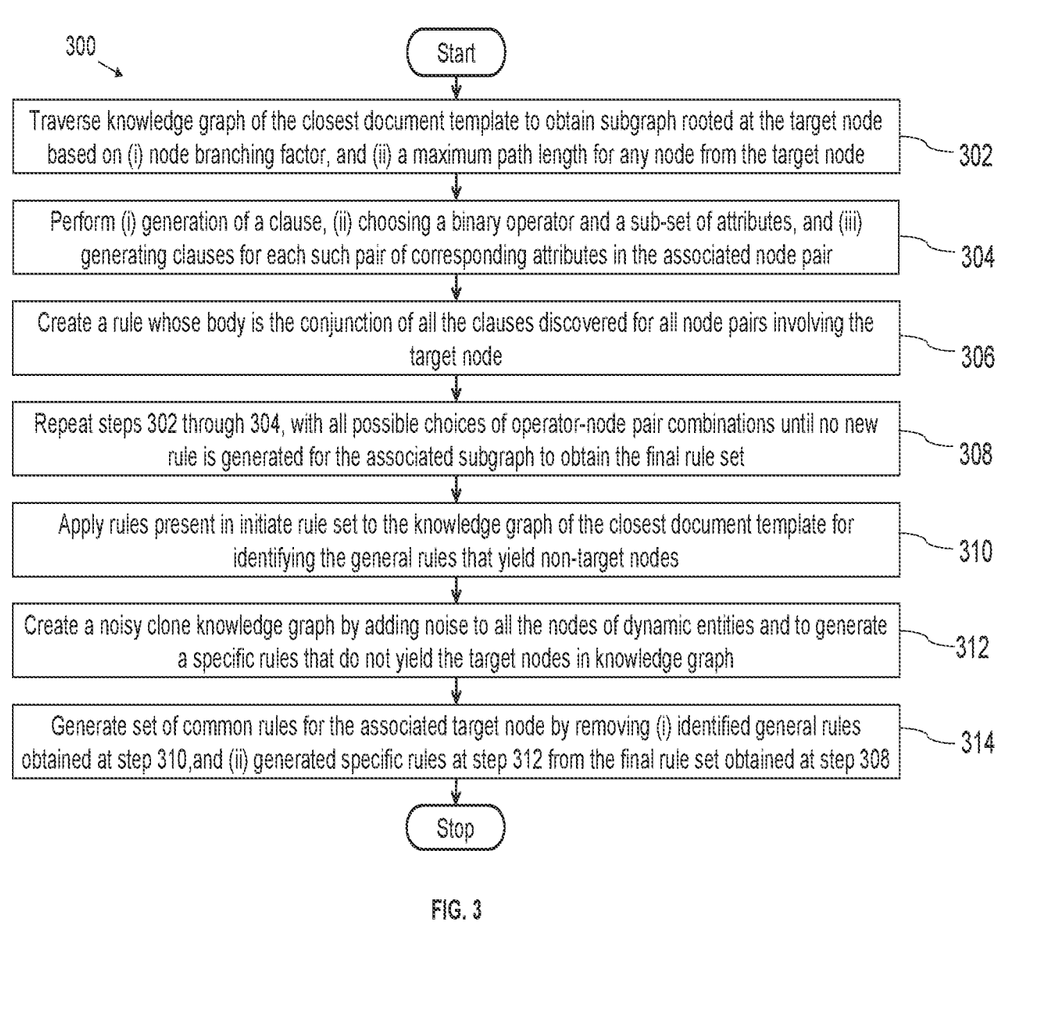
FIG. 3 illustrates an exemplary flow diagram for generation of common rules for each target node present in the knowledge graph of the closest matching document template, in accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary systems and/or methods.

FIG. 1 is an exemplary block diagram of a system 100 for extracting information from document images, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer, and the Ike. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a. The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (not shown in FIG. 1). Further, the memory 102 may include information pertaining to input(s)/output(s) of each step performed by the processor(s) 104 of the system 100 and methods of the present disclosure.

The repository 102b may include a database or a data engine. Further, the repository 102b amongst other things, may serve as a database or includes a plurality of databases for storing the data that is processed, received, or generated as a result of the execution of the plurality of modules 102a. Although the repository 102a is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

Referring to FIG. 2, components, and functionalities of the system 100 are described in accordance with an example embodiment of the present disclosure. For example, FIG. 2 illustrates exemplary flow diagrams of a processor-implemented method 200 for extracting information from document images, in accordance with some embodiments of the present disclosure. Although steps of the method 200 including process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

In the context of the present disclosure, the terms such as 'document mage', 'scanned document mage', and 'image of templatized document' may be interchangeably used based on the context, however the terms refer to the document received in the form of image and associated with the document template that has a predefine document structure, from which the information to be extracted.

At step 202 of the method 200, the one or more hardware processors 104 of the system 100 are configured to receive at least one image of each of the one or more templatized documents from which the information to be extracted, and a template document dataset. The document template dataset includes (i) a plurality of document templates (ii) a knowledge graph for each document template of the plurality of document templates, and (i) an annotation set for each document template of the one or more templatized documents.

The image of one or more templatized documents are a scanned document image obtained through a scanner or captured through a digital camera, image acquisition unit present in mobile device such as mobile phone, smart phone, and so on. The image of templatized document includes one or more visual elements. The one or more visual elements include at least one of: one or more textual blocks, one or more tables, one or more checkboxes, one or more charts, one or more graphs, one or more form field boxes, and so on. Each visual element of the one or more visual elements, includes one or more textual contents and each textual content comprises a sequence of text tokens. Each textual content may be present in one line or multiple lines across the image of templatized document. Further, each textual content may include alphabetical characters, numerical characters, special characters, special symbols, or as a combination thereof. The information to be extracted includes the one or more textual contents present in the one or more visual elements of the image of templatized document. For example, in case of invoice, the textual contents to be extracted include invoice number (value), invoice date (value), invoice amount (value), client name (value), client address (value), and so on, that are to be extracted. The client address (value) may mostly spanned in multiple lines.

In one embodiment, the one or more textual contents present in each visual element of the image of templatized document, may be in the form of digital text. In another embodiment, the one or more textual contents present in each visual element of the image of templatized document, may be in the form of hand-written text. In yet another embodiment, the one or more textual contents present in each visual element of the image of templatized document, may be in the form of both the digital text and the hand-written text, where some of the one or more textual contents may be present in the form of the digital text, while other textual contents may be present in the form of the hand-written text.

Each document template of the plurality of document templates define the document structure and all documents that belongs to the document template must adhere to the same structure. Each document template includes a predefined set of entities (such as invoice number, date, or billing address, from invoice document template). Some entities out of the predefined set of entities present in each document template, may be static components and while other entities are dynamic components. The static components are those entities whose spatial positions in the corresponding document template are fixed. For example, in case of invoice, spatial position of the entities such as 'invoice date', 'invoice number' are fixed as per the document structure. The dynamic components are those entities whose spatial positions may vary (change) in the corresponding document template. For example, in case of invoice, '12345 (invoice number)' may be positioned at the bottom or right side to that of the entity 'invoice'. In other words, the dynamic components are the entity values whose position may vary around the entities that are the static components.

In another embodiment, the static components present in one document template may be different or same to that of the static components present in another document template. Similarly, the dynamic components present in one document template may be different or same to that of the dynamic components present in another document template. In yet another embodiment, some static components or all static components present in one document template may be the dynamic components in another document template and vice versa. More formally given the document template with static components S and dynamic components C, the spatial and semantic relationships between the static components and dynamic components of all documents from the same template must hold consistently. The annotation set for each document template of the plurality of document templates, includes the predefined set of entities out of the entities that are static components. In another words the annotation set refers to the one or more static components (for example, invoice number) that are targeted to extract the corresponding entity values (for example, 12345 (invoice number)) present in the image of templatized document.

Let the plurality of document templates N be $T_1, T_2, \ldots, T_n$, the predefined set of entities that are in each document template be $e_1, e_2, \ldots, e_n$. The image of templatized document may belongs to one of the plurality of document templates $T_1, T_2, \ldots, T_n$, however the document template for the image of templatized document is unknown. The objective of the present disclosure is to recognize the closely matching document template if exists out of the plurality of document templates N, and to extract entity values for the predefined set of entities $e_1, e_2, \ldots, e_n$, present in the closely matching document template, from the image of templatized document.

Further, each document template t may be described as $t=(line_1, above_1, left_1 \ldots, w_1), \ldots, =(line_n, above_n, left_n, \ldots, w_n)$ where $line_1$ indicates an entity (one of the component from static components S and dynamic components C) in the template. The $above_1$, $left_1$ describes its spatial relations with other entities present in other lines of the template document. The $w_1$ denotes a weight value representing the confidence that $line_1$ will be found in the image of templatized document of the corresponding document template t.

The knowledge graph for each document template of the plurality of document templates, may be obtained using a predefined knowledge graph schema, based on the background knowledge, that captures the spatial and semantic relations between the predefined set of entities present in the associated document template.

At step 204 of the method 200, the one or more hardware processors 104 of the system 100 are configured to pre-process the image of templatized document received at step 202 of the method, from which the information to be extracted, to obtain a pre-processed image of templatized document. In an embodiment, the pre-processing includes removing the noise present in the image of templatized document. In an embodiment, the noise present in the image of templatized document includes blur effects, faded text, watermarks, scanning artifacts, wrinkles, and so on. In an embodiment, a cycle GAN (generative adversarial network) technique may be used to remove the noise present in the image of templatized document. The cycle GAN technique learns mappings of the distribution of noisy documents to that of the clean documents.

At step 206 of the method 200, the one or more hardware processors 104 of the system 100 are configured to detect (i) one or more text lines and one or more words present in each text line, for each visual element of the one or more visual elements present in the pre-processed image of templatized document, and (ii) one or more spatial elements for each word of the one or more words and one or more spatial elements for each text line of the one or more text lines, from the pre-processed image of templatized document obtained at step 206 of the method 200. The one or more text lines and the one or more words present in each text line, of each visual element represents the one or more textual contents present in the corresponding visual element of the pre-processed image of templatized document. The one or more spatial elements of each word include the one or more words that are present to a left side, a right side, above and below to the corresponding word. The one or more words may be present in the same text line or in the below text line or in the above text line. Similarly, the spatial elements of each text line include one or more text lines that are present to the left side, the right side, above and below to the corresponding text line. In an embodiment, two or more text lines may present in one row, and adjacent to each other but separated with some defined gap (for example, two-tab spaces).

In one embodiment, the one or more text lines and the one or more words present in each text line, and associated spatial elements, of each visual element present in the pre-processed image of templatized document, may be detected by using a corresponding vision tool present in a set of vision tools. In another embodiment, the set of vision tools of the system are the optical character recognition (OCR) tools and includes a text detection tool, a table detection and tabular structure identification tool, a drawing information extraction tool and a visual cues tool.

In one embodiment, the text detection tool is used to detect the one or more text lines and the one or more words present in each text line, particularly, the hand-written text, along with the associated spatial elements, present in the one or more text blocks, of the processed image of templatized document. In another embodiment, a pre-trained deep learning model may be used as the text detection tool.

The table detection and tabular structure identification tool is used if the pre-processed image of templatized document contains one or more tables and the textual content present inside it. In one embodiment, a combination of (i) pre-trained deep neural model and (ii) an existing common knowledge about the tables along the lines, is used to obtain the table detection and tabular structure identification tool. The table detection and tabular structure identification tool detects the one or more text lines and the one or more words present in each text line, present in the one or more tables, along with the associated spatial elements.

The drawing information extraction tool of the system is used if the pre-processed image of templatized document contains one or more drawings and the textual content present inside it. The one or more drawings include histograms, graphs, charts, and other complex data visualizations that may be present in the pre-processed image of templatized document. In an embodiment, a pretrained MAC network-based tool to reason over charts, may be used as the drawing information extraction tool. The drawing information extraction tool detects the one or more text lines and the one or more words present in each text line, that are present in the one or more drawings, along with the associated spatial elements.

The visual cues tool is used to detect font styles, lines, strokes, text structure, and so on associated with each textual element present in the one or more words, and the one or more text lines present in each visual element of the one or more visual elements of the pre-processed image of templatized document. In an embodiment, a combination of: (i) pre-trained deep neural model and (ii) a traditional vision may be used to obtain the visual cues tool.

At step 208 of the method 200, the one or more hardware processors 104 of the system 100 are configured to generate a knowledge graph for the pre-processed image of templatized document, based on a predefined knowledge graph schema, using (i) the identified one or more text lines and the one or more words present in each text line, for each visual element of the one or more visual elements, and (ii) the spatial elements of each word of the one or more words present in each text line and the spatial elements of each text line of the one or more text lines, present in the corresponding visual element.

In the knowledge graph for the pre-processed image of templatized document, each word is represented by a node, and a sub-graph for each word is formed using the corresponding spatial elements. Each corresponding spatial element is represented by the node in the associated sub-graph for each word and therefore the sub-graph for each word includes the nodes of spatial elements, that are connected the node of the corresponding word. Further, each text line is represented by the node, and the sub-graph for each text line is formed where the one or more words present in the corresponding text line are represented by nodes along with the corresponding spatial elements. Each corresponding spatial element is represented by the node in the associated sub-graph for each text line and therefore the sub-graph for each text line includes the nodes of spatial elements, that are connected the node of the corresponding text line. The knowledge graph for the each of the pre-processed images of the one or more templatized documents, defines spatial and semantic relationship of the one or more textual contents present in each visual element of the one or more visual elements of the pre-processed image of templatized document.

Background knowledge and natural language understanding is also used for semantic data typing for commonly occurring textual content patterns like dates, city names and addresses in case of invoice document. Additional domain specific knowledge may also be used to deal with certain specialized use-cases. These complex relationships are stored in a knowledge graph with the fixed schema. The nodes in the knowledge graph are typed and represent different entities such as the words and the text lines present in the pre-processed image of templatized document. These nodes may be suitably enriched with additional attributes to incorporate domain knowledge such as semantic data types.

At step 210 of the method 200, the one or more hardware processors 104 of the system 100 are configured to detect a closest document template for the each image of the one or more templatized documents received at step 202 of the method 200, out of the plurality of document templates present in the document template dataset, based on a document similarity metric, using the knowledge graph of the pre-processed image of templatized document, obtained at step 206 of the method 200, and the knowledge graph of each document template of the plurality of document templates received at step 202 of the method 200.

The document similarity metric includes a textual similarity metric and a layout structure similarity metric. The textual similarity metric calculates a textual similarity for the image of templatized document, between (i) the pre-processed image of templatized document, and (ii) each document template of the plurality of document templates. In detail, the textual similarity metric for the image of the templatized document is calculated based on the number of matching entities present in (i) the knowledge graph of the pre-processed image of templatized document, and (ii) the knowledge graph of each document template of the plurality of document templates. The one or more document templates having a maximum textual similarity metric are chosen as one or more initial closest document templates for the image of templatized document.

Next, the layout structure similarity metric calculates a layout structure similarity for the image of templatized document, between (i) the pre-processed image of the templatized document, and (ii) each initial closest document template of the one or more initial closest document templates, chosen based on the textual similarity metric. Firstly, a updated knowledge graph for the pre-processed image of the templatized document against each initial closest document ten plate of the one or more initial closest document templates, is generated by reducing the entities in the knowledge graph of the pre-processed image of the templatized document, that are present in the corresponding knowledge graph of the initial closest document template. In this step, one or more static entities (components) and one or more dynamic entities (components) that are present in the knowledge graph of the associated initial closest document template are identified. Then, the one or more detected dynamic components are replaced with a token <va/> in the knowledge graph of the templatized document. Furthermore, as there may be often digitization errors in the entity names, fuzzy matching (for example, based on Levenshtein distance) to detect dynamic entities from the associated initial closest document template. Then, the updated knowledge graph for the pre-processed image of templatized document against the associated initial closest document template, is generated, by comparing the paths of each pair of distinct nodes associated with the detected dynamic entities, present in the knowledge graph of the initial closest document template, with corresponding nodes associated with the detected dynamic entities in the knowledge graph of the image of templatized document.

More specifically, in the first sub step, any two distinct nodes (detected dynamic entities) from the knowledge graph of the associated initial closest document template are picked to find all the nodes (detected dynamic entities entities) between the two picked distinct nodes from the knowledge graph of the image of templatized document. In the second sub step, all the in between nodes (entities) from the knowledge graph of the image of templatized document are removed to create a direct relationship between them to get a shortest path. For example, if the relationship between all the intermediate nodes was 'ABOVE', the new relationship also created as 'ABOVE'. Both the two sub steps are repeated for all pairs of distinct nodes in the knowledge graph of the associated initial closest document template, to generate the updated knowledge graph for the image of templatized document against the associated initial closest document template.

Once the updated knowledge graph for the pre-processed image of templatized document against each initial closest document template, is generated, the layout structure similarity metric for the image of templatized document against each initial closest document template, is computed based on the (i) updated knowledge graph of the pre-processed image of templatized document, and (ii) the knowledge graph of the associated initial closest document template, using a lattice based approach which works based on the formal concept analysis (FCA).

The FCA is a mathematical theory of concept hierarchies based on lattice theory. Data is represented as a two-dimensional context of objects and attributes. Traditionally, a concept is determined by its extent and its intent. The extent of a concept consists of all objects that have a set of common attributes in a context, while the intent consists of all attributes that are considered valid for that context. The hierarchy of concepts is given by the relation of a sub-concept with respect to a certain super-concept, i.e., the extent of a sub-concept is a subset of the extent of its super-concepts, while the intent of a super-concept is a subset of the intent of its sub-concepts.

The lattice based approach is used to view (i) the updated knowledge graph of the pre-processed image of templatized document, and (ii) the knowledge graph of the associated initial closest document template, as formal concepts representing a triplet of the form (O, P, I) where O is the set of entities present in the pre-processed image of templatized document, P is the set of spatial relations corresponding to each entity and I is a binary relation between O and P. Each triplet produces a lattice structure for the corresponding pre-processed image of templatized document (knowledge graph). The lattice structure consists of a set of formal concepts of the form (A, B), where $A \subseteq O$, $B \subseteq P$, $A'=B$, $B'=A$. The spatial relationships of each entity present in the updated knowledge graph of the image of templatized document, and (ii) the knowledge graph of the associated initial closest document template are represented by the intents of the lattice constructed for that pre-processed image of templatized document (knowledge graph).

Using the approach of lattices, the similarity relationships are extracted with the help of corresponding knowledge graphs (the updated knowledge graph of the pre-processed image of templatized document, and (ii) the knowledge graph of the associated initial closest document template. The extracted similarity relationships are used to compare the structure of the pre-processed image of templatized document with the structure of the associated initial closest document template. As a first step, the relationships for every entity present in the updated knowledge graph of the pre-processed image of templatized document, are extracted, where the relationships for every node present in the updated knowledge graph of the pre-processed image of templatized document, is stored in the form of a tuple. For example:

$node_i$: ($node_j$(ABOVE), $node_k$(LEFT))

The tuples generated correspond to the intents which defined set of rules generated from FCA. Next, the relationship tuples of the associated initial closest document template are extracted. The tuples of the updated knowledge graph of the image of templatized document are then compared with the tuples of the associated initial closest document template, to calculate the layout structure similarity metric for the image of templatized document, against the associated initial closest document template. The maximum layout structure similarity metric is identified, and the corresponding initial closest document template is detected.

If the maximum layout structure similarity metric is greater than a predefined layout similarity threshold $\gamma$, then the corresponding initial closest document template is considered as the closest document template, out of the one or more initial closest document templates, for the image of templatized document received at step 202 of the method 200. In an embodiment, the predefined layout similarity threshold γ may be 0.6.

If the maximum layout structure similarity metric is less than or equal to the predefined layout similarity threshold γ, then the image of templatized document received at step 202 of the method 200, is considered as a new document template and is added to the plurality of document templates present in the document template dataset. Accordingly, the knowledge graph obtained for the image of templatized document, at step 206 of the method is added to the document template dataset. Further, the annotated set for the image of templatized document is received from the user is stored in the document template dataset.

At step 210 of the method 200, the one or more hardware processors 104 of the system 100 are configured to generate a rule set for the closest document template detected at step 208 of the method 200, for the image of templatized document received at step 202 of the method 200. In an embodiment, an inductive rule learning based approach is used to generate the rule set for the closest document template.

The rule set for the closest document template, includes a set of rules for each target node of the one or more target nodes that are present in the knowledge graph of the closest document template. Each target node refers to the target entity (static component and out of one or more entities present in the annotation set) that is present in the closest document template. The set of rules for each target node includes at least one of: a set of common rules and a set of meta-rules.

Let the target node be $N_t$ corresponding to the entity value to be extracted, the knowledge graph of the closest document template be D, a set of m attributes $A=(a_1, a_2, \ldots, a_m)$ for each other node $n_i$, a set of binary operators O defined over elements of A, a node branching factor b, a depth bound d. Here the attributes refer the spatial relations of the entities. Here the node branching factor b defines a conjunction level and the depth bound d defines a maximum path length or a chain size. The generation of the set of rules having at least of: the set of common rules $R_c$, and the set of meta-rules $R_m$, for each target node $N_t$ is described below in detail.

FIG. 3 illustrates an exemplary flow diagram (300) for generation of common rules for each target node present in the knowledge graph of the closest matching document template, in accordance with some embodiments of the present disclosure. At step 302 of the method 300, the one or more hardware processors 104 of the system 100 are configured to traverse the knowledge graph of the closest document template D, to obtain a set of all possible subgraphs $S_G$ rooted at the target node $N_t$, with the target node be $N_t$ as the root node, based on the (i) node branching factor b, and (ii) a maximum path length for any node from the target node be $N_t$ is less than or equal to the depth bound d.

At step 304 of the method 300, the one or more hardware processors 104 of the system 100 are configured to perform, for each node pair $n_i$ and $n_j$ present in each subgraph $S_G$ of the set of all possible subgraphs, (i) generation of a clause, if the associated node pair $n_i$ and $n_j$ is connected by a relation R in the subgraph $S_G$, (ii) choosing a binary operator op∈O and a sub-set of attributes $s_A \subset A$ on which the conditional operator holds for the associated node pair $n_i$ and $n_j$, i.e. op $(a_{ik}, a_{jk})$ must be true∀k such that $a_k \in s_A$ where $a_{pm}$ refers to the value of attributes $a_m$ for node p, and (iii) generate clauses for each such pair of corresponding attributes in the associated node pair $n_i$ and $n_j$, i.e. attr $(n_i, k, a_{ik})$, . attr $(n_j, k, a_{jk})$, . opl $(a_{ik}, a_{jk})$.

At step 306 of the method 300, the one or more hardware processors 104 of the system 100 are configured to create a rule whose body is the conjunction of all the clauses discovered for all node pairs involving the the target node $N_t$, and whose head is simply the target node $N_t$, i.e. entity$_{name}$(D, $N_t$), and to add the created rule to the initial rule set.

At step 308 of the method 300, the one or more hardware processors 104 of the system 100 are configured to, repeat the steps 302 through 304, with all possible choices of operator-node pair combinations until no new rule is generated for the associated subgraph $S_G$, to obtain the final rule set.

At step 310 of the method 300, the one or more hardware processors 104 of the system 100 are configured to, apply the rules present in the initial rule set R to the knowledge graph of the closest document template D, for identifying the general rules that yield non-target nodes (n ∉ $N_t$).

At step 312 of the method 300, the one or more hardware processors 104 of the system 100 are configured to create a noisy clone knowledge graph KG', by adding noise to all the nodes of dynamic entities, and to generate a specific rules that do not yield the target nodes in KG'.

At step 314 of the method 300, the one or more hardware processors 104 of the system 100 are configured to generate the set of common rules $R_c$, for the associated target node $N_t$, by removing (i) the identified general rules obtained at step 310 of the method 300, and (ii) the generated specific rules obtained at step 312 of the method 300, from the final rule set obtained at step 308 of the method 300.

Occasionally some entity values span a variable number of textual elements, i.e. may comprise of multiple words, lines, or blocks, in the image of templatized document. Such entity values correspond to multiple target nodes in the respective knowledge graph. Learning rules for multiple-target nodes involves learning a meta-rule which comprises of a starting target node $n_s$, an ending target node $n_e$, and a relationship subgraph $R_G$.

For the generation of set of meta-rules $R_m$, for the associated target node $N_t$, a sub knowledge graph (KG') is generated first, with a set of some finite attributes, where each edge includes one or more relationships and the target node is the entity value that needs to be extracted. After the generation of the sub knowledge graph (KG'), a set of subgraphs are formed with target node, based on the branching factor b and the depth bound d. For these subgraphs, the rules are then generated for each node present in each subgraph of the set of subgraphs, using the operators and relationships between the nodes. These generated rules then are filtered out by using a one-shot noisy clone (adding noise to target values in the knowledge graph). In the case of multiple target nodes, a meta-relationship is created between the multiple target nodes and store the same as a part of the rule, when a rule is applied to a new knowledge graph, after getting the output node meta-relationship is applied on the node to get the complete set of target nodes for that knowledge graph. The generated rule set for the closest document template is stored in the repository 102b of the system 100 for future use.

At step 212 of the method 200, the one or more hardware processors 104 of the system 100 are configured to apply the generated rule set of the closest document template on the knowledge graph of the pre-processed image of templatized document obtained at step 208 of the method 200 to extract the information present in the image of templatized document received at step 202 of the method 200.

As the set of rules for each target node present in the generated rule set is associated with the target entity present in the knowledge graph of the closest document template, the associated set of rules for the target node are applied on the node present in the knowledge graph associated with the entity value present in the image of templatized document. For example, if the target entity is 'invoice number', then the set of rules for the target node associated with the 'invoice number' are applied on the node associated with 'invoice number' present in the knowledge graph of the in the image of templatized document, to extract the entity value (number of the invoice) present in the image of templatized document.

The set of meta-rules present in the set of rules for each target node are used to extract the entity value that span over multiple lines present in the image of templatized document. For example, the entity value 'address' may span in multiple lines in the image of templatized document.

In one example, wherein to evaluate the performance of the present disclosure, a publicly shared dataset of 1400 scanned bank trade finance documents. The dataset consists of documents of seven different templates associated with banks i.e. B1, B1, B3, B4, B5, B6, and B7 with 200 documents from each template. Documents from different templates are introduced randomly and the present disclosure dynamically identifies novel templates and generates extraction rules for them after manual annotation of a single document for each template. The performance of the present disclosure evaluated for both matching template detection and information extraction.

Matching template Detection. predefined layout similarity threshold γ, is considered as 0.6. For a given image of templatized document d, the document template having the highest confidence value above the predefined layout similarity threshold γ, is assigned. The predefined layout similarity threshold γ is set to achieve high precision while compromising on recall. This implies that there are no false classifications made. However, occasionally a noisy image of templatized document may get misclassified as belonging to a new document template. However, each such document is simply routed for manual annotation to (i) build on a new template structure or (ii) re-assigned to an existing document template.

TABLE 1

| S. No. | Template | Precision | Recall |
|---|---|---|---|
| 1 | B1 | 1.00 | 1.00 |
| 2 | B2 | 1.00 | 1.00 |
| 3 | B3 | 1.00 | 0.74 |
| 4 | B4 | 1.00 | 0.98 |
| 5 | B5 | 1.00 | 0.77 |
| 6 | B6 | 1.00 | 1.00 |
| 7 | B7 | 1.00 | 0.99 |
| | Overall | 1.00 | 0.93 |

Table 1 shows the precision and recall for each template and an overall precision and recall for matching template detection. From table, the overall precision and recall achieved are 1.00 and 0.93 respectively, thereby giving F1 score and matching template detection accuracy as 0.96 and 92.63% respectively.

Information Extraction; To evaluate the quality in the information extraction, the actual output values, $v_{i1}, \ldots, v_{ip}$ for each predefined entity $e_i$, are compared with their corresponding ground truth values, $g_{i1}, \ldots, g_{iq}$ for image of templatized document belonging to one of m=7 templates $T_k$, k=1, ..., m, as a measure of accuracy, i.e. for an entity $e_i$ of a template $T_k$, checks for an exact match between the predicted value and the ground-truth.

$$\text{Accuracy} = \frac{\text{No. of documents such that } v_{ir} = g_{is}}{\text{Total no. of documents for } T_K}$$

where $r = 1, \ldots, p$ and $s = 1, \ldots, q$

The accuracy of rule learning is also obtained by disregarding OCR errors in the final entity string value. The Jellyfish library [Michael Stephens James Turk. Jellyfish, a python library for approximate and phonetic matching of strings, year=2018] is used in the current implementation which helps in approximate and phonetic matching of strings. Table 2 shows the accuracy for each predefined entity from all the seven different templates with OCR errors, which results in overall accuracy of 93.5%.

TABLE 2

| S. No. | Entity | B1 | B2 | B3 | B4 | B5 | B6 | B7 | Mean accuracy |
|---|---|---|---|---|---|---|---|---|---|
| 1 | Acc number | 98.5 | 96.5 | — | | | | | 97.5 |
| 2 | Amount | 98.5 | 90.5 | 91.0 | 100 | 98.5 | 99.5 | 92.7 | 95.8 |
| 3 | Date | 100 | 94.5 | 98.5 | 77.5 | 98.5 | 94.5 | 95.5 | 94.1 |
| 4 | Phone | 97.5 | — | 100 | 94.0 | — | — | 89.3 | 95.2 |
| 5 | Ref | 91.5 | — | 98.5 | 89.5 | 98.5 | 100 | 87.6 | 94.3 |
| 6 | Swift | 78.0 | 78.0 | 84.5 | 91.5 | 98.5 | 100 | 92.1 | 88.9 |
| 7 | Tenor | 98.0 | 100 | 99.5 | 100 | 98.5 | 100 | 100 | 99.4 |
| 8 | Drawee | 83.0 | 90.0 | 70.5 | 95.0 | 98.5 | 89.5 | 91.5 | 88.3 |
| 9 | Drawer | 93.5 | 78.5 | 74.5 | 88.5 | 98.5 | 98.0 | 87.6 | 88.2 |
| | | | | Overall | | | | | 93.5 |

Without OCR errors the overall accuracy for obtaining the correct target node (entity value) was 100% which demonstrates the robustness of the disclosed inductive rule learning technique. Thus, all-inclusive out of 1400 documents of trade finance from different banks, 1297 documents were classified correctly, while the information extraction is able to obtain the correct node or textual entity 100% of the time.

In accordance with the present disclosure, the methods and systems for extracting the information from document images, of the present disclosure, effectively identify the closely matching document template, based on the spatial and semantic relationships and as well as structural similarity using the adaptive lattice based approach based on FCA and the inductive rule learning technique effectively and accurately extract the information from the image of templatized document by applying the rules on the knowledge graph of the image of templatized document. Experimental results also show that methods and systems of the present disclosure are efficient and accurate for extracting the information from the image of templatized document. Further, the present disclosure provides the end-to-end technique for information extraction without any manual intervention. Also, the present disclosure detects the new document templates and stores in the repository for future use.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

What is claimed is:

1. A processor-implemented method (200) for extracting information from images of one or more templatized documents comprising:
   receiving (202), via an input/output interface, at least one image of each of the one or more templatized documents in a predefined sequence from which the information to be extracted and a template document dataset, wherein the template document dataset includes a predefined set of template documents, a knowledge graph for each template document and a rule set for each of the one or more template documents of the set of template documents;
   preprocessing (204), via one or more hardware processors, the received at least one image of each of the one or more templatized documents using a cycle generative adversarial network (GAN) to obtain a pre-processed image of each of the one or more templatized documents, wherein the pre-processing includes denoising;
   identifying (206), via the one or more hardware processors, words and sentences along with a spatial relationship for each word from each pre-processed image of the one or more templatized documents using a vision model and an optical character recognition (OCR) technique, wherein the words and sentences are identified from text, tables, charts, and checkboxes present in each pre-processed image of the one or more templatized documents;
   generating (208), via the one or more hardware processors, a knowledge graph for each pre-processed image of the one or more templatized documents using a schema from the identified words and sentences, and the spatial relationship for each word, wherein each word is represented by a node, and a sub-graph for each word formed in the generated knowledge graph;
   determining (210), via the one or more hardware processors, a similarity metric by comparing the generated knowledge graph of each pre-processed image with a knowledge graph of each template document present in the template document dataset using a Formal Concept Analysis (FCA), wherein the similarity metric provides at least one matched template document from the template document dataset for each pre-processed image of the one or more templatized documents; and
   extracting (212), via the one or more hardware processors, the information of the pre-processed image by applying a rule set of the at least one matched template document from the template document dataset on the generated knowledge graph of each pre-processed image of the one or more templatized documents.

2. The processor-implemented method (200) of claim 1, further comprising:
   comparing, via the one or more hardware processors, paths of each pair of nodes in the knowledge graph of the matched template document with corresponding nodes in the generated knowledge graph to remove at least one node from the generated knowledge graph and to obtain an updated knowledge graph corresponding to each pre-processed image of the one or more templatized documents; and
   calculating, via the one or more hardware processors, a layout similarity metric of each pre-processed image by comparing the updated knowledge graph with the matched knowledge graph using a lattice based structural similarity technique, wherein the layout similarity metric is below a predefined confidence threshold then the pre-processed image is sent for a manual annotation.

3. The processor-implemented method (200) of claim 1, wherein an inductive rule learning technique is used to define the rule set for each template document using the corresponding knowledge graph.

4. The processor-implemented method (200) of claim 1, wherein the spatial relationship for each word includes the words and sentences that are present to the left side, right side, above and below to the corresponding word.

5. The processor-implemented method (200) of claim 1, wherein the sub-graph for each word includes the nodes of spatial elements, that are connected the node of the corresponding word.

6. The processor-implemented method (200) of claim 1, the knowledge graph defines a spatial and semantic relationship of the information present in the pre-processed image document.

7. A system (100) for extracting information from images of one or more templatized documents comprising:
an input/output interface (106) to receive at least one image of each of the one or more templatized documents in a predefined sequence from which the information to be extracted and a template document dataset, wherein the template document dataset includes a predefined set of template documents, a knowledge graph for each template document and a rule set for each template document;
one or more hardware processors (104);
a memory (102) in communication with the one or more hardware processors (104), wherein the one or more hardware processors (104) are configured to execute programmed instructions stored in the memory (102), to:
preprocess the received at least one image of each of the one or more templatized documents using a cycle generative adversarial network (GAN) to obtain a pre-processed image of each of the one or more templatized documents, wherein the pre-processing includes de-noising;
identify words and sentences along with a spatial relationship for each word from each pre-processed image of the one or more templatized documents using a vision model and an optical character recognition (OCR) technique, wherein the words and sentences are identified from text, tables, charts, and checkbox present in each pre-processed image of the one or more templatized documents;
generate a knowledge graph for each pre-processed image of the one or more templatized documents using a schema from the identified words and sentences, and the spatial relationship for each word, wherein each word is represented by a node, and a sub-graph for each word formed in the generated knowledge graph;
determine a similarity metric by comparing the generated knowledge graph of each pre-processed image with a knowledge graph of each template document present in the template document dataset using a Formal Concept Analysis (FCA), wherein the similarity metric provides at least one matched template document from the template document dataset for each pre-processed image of the one or more templatized documents; and
extract the information of the pre-processed image by applying a rule set of the at least one matched template document from the template document dataset on the generated knowledge graph of each pre-processed image of the one or more templatized documents.

8. The system (100) of claim 7, further comprising:
comparing, via the one or more hardware processors, paths of each pair of nodes in the knowledge graph of the matched template document with corresponding nodes in the generated knowledge graph to remove at least one node from the generated knowledge graph and to obtain an updated knowledge graph corresponding to each pre-processed image of the one or more templatized documents; and
calculating, via the one or more hardware processors, a layout similarity metric of each pre-processed image by comparing the updated knowledge graph with the matched knowledge graph using a lattice based structural similarity technique, wherein the layout similarity metric is below a predefined confidence threshold then the pre-processed image is sent for a manual annotation.

9. A non-transitory computer readable medium storing one or more instructions which when executed by one or more processors on a system, cause the one or more processors to perform method comprising:
receiving, via an input/output interface, at least one image of each of the one or more templatized documents in a predefined sequence from which the information to be extracted and a template document dataset, wherein the template document dataset includes a predefined set of template documents, a knowledge graph for each template document and a rule set for each template document;
preprocessing, via one or more hardware processors, the received at least one image of each of the one or more templatized documents using a cycle generative adversarial network (GAN) to obtain a pre-processed image of each of the one or more templatized documents, wherein the pre-processing includes de-noising;
identifying, via the one or more hardware processors, words and sentences along with a spatial relationship for each word from each pre-processed image of the one or more templatized documents using a vision model and an optical character recognition (OCR) technique, wherein the words and sentences are identified from text, tables, charts, and checkbox present in each pre-processed image of the one or more templatized documents;
generating, via the one or more hardware processors, a knowledge graph for each pre-processed image of the one or more templatized documents using a schema from the identified words and sentences, and the spatial relationship for each word, wherein each word is represented by a node, and a sub-graph for each word formed in the generated knowledge graph;
determining, via the one or more hardware processors, a similarity metric by comparing the generated knowledge graph of each pre-processed image with a knowledge graph of each template document present in the template document dataset using a Formal Concept Analysis (FCA), wherein the similarity metric provides at least one matched template document from the template document dataset for each pre-processed image of the one or more templatized documents; and
extracting, via the one or more hardware processors, the information of the pre-processed image by applying a rule set of the at least one matched template document from the template document dataset on the generated knowledge graph of each pre-processed image of the one or more templatized documents.

10. The non-transitory computer readable medium of claim 9, further comprising:
- comparing, via the one or more hardware processors, paths of each pair of nodes in the knowledge graph of the matched template document with corresponding nodes in the generated knowledge graph to remove at least one node from the generated knowledge graph and to obtain an updated knowledge graph corresponding to each pre-processed image of the one or more templatized documents; and
- calculating, via the one or more hardware processors, a layout similarity metric of each pre-processed image by comparing the updated knowledge graph with the matched knowledge graph using a lattice based structural similarity technique, wherein the layout similarity metric is below a predefined confidence threshold then the pre-processed image is sent for a manual annotation.

* * * * *